United States Patent
Loos et al.

(10) Patent No.: US 7,318,961 B2
(45) Date of Patent: Jan. 15, 2008

(54) POLYOLEFIN FILM, TAPE OR YARN

(75) Inventors: Joachim Loos, Nuenen (NL); Johannes Antonius Joseph Jacobs, Heerenveen (NL); Antonius Andreas Johannes Maria Peijs, Veldhoven (NL); Tilo Schimanski, Schweitenkirchen (DE)

(73) Assignee: Lankhorst Indutech B.V., Sneek (NL)

( * ) Notice: Subject to any disclaimer, the term of this patent is extended or adjusted under 35 U.S.C. 154(b) by 0 days.

(21) Appl. No.: 10/483,927

(22) PCT Filed: Jul. 19, 2002

(86) PCT No.: PCT/NL02/00487

§ 371 (c)(1),
(2), (4) Date: Jun. 28, 2004

(87) PCT Pub. No.: WO03/008190

PCT Pub. Date: Jan. 30, 2003

(65) Prior Publication Data

US 2004/0242103 A1  Dec. 2, 2004

(30) Foreign Application Priority Data

Jul. 19, 2001 (EP) ................... 01202757
Oct. 4, 2001 (EP) ................... 01203764

(51) Int. Cl.
*B32B 27/08* (2006.01)
(52) U.S. Cl. ........................ 428/516; 428/213; 428/910; 264/173.15; 442/334; 442/378
(58) Field of Classification Search ............ 428/516, 428/910, 213; 264/173.15; 442/334, 378
See application file for complete search history.

(56) References Cited

U.S. PATENT DOCUMENTS

| | | | |
|---|---|---|---|
| 4,331,624 A | 5/1982 | Yazawa et al. | |
| 4,405,775 A * | 9/1983 | Hashimoto | 526/351 |
| 4,716,068 A | 12/1987 | Crass et al. | |
| 5,302,453 A | 4/1994 | Kouno et al. | |
| 5,443,765 A | 8/1995 | Yoshimura et al. | |
| 5,578,370 A | 11/1996 | Ferrar et al. | |
| 5,709,932 A * | 1/1998 | Glez et al. | 428/220 |
| 5,861,202 A * | 1/1999 | Kimura et al. | 428/105 |
| 6,071,598 A | 6/2000 | Winter et al. | |
| 6,106,924 A * | 8/2000 | Yamazaki | 428/136 |
| 6,127,293 A * | 10/2000 | Kimura et al. | 442/199 |

FOREIGN PATENT DOCUMENTS

| | | |
|---|---|---|
| EP | 0 366 210 A | 5/1990 |
| EP | 0 483 780 A | 5/1992 |
| EP | 0 733 460 A | 9/1996 |
| GB | 1 244 860 A | 9/1971 |
| GB | 1 532 076 A | 11/1978 |

OTHER PUBLICATIONS

Encyclopedia of Polymer Science and Engineering, "Polypropylene" (1985 ed), pp. 477 & 515.*

* cited by examiner

*Primary Examiner*—Sheeba Ahmed
(74) *Attorney, Agent, or Firm*—Pearne & Gordon LLP

(57) ABSTRACT

The invention is directed to monoaxially drawn polyolefin multilayer film, tape or yarn of the AB or ABA type, having a stretch ratio of more than 12, having an E-modulus of at least 10 GPa, substantially consisting of a central layer (B) of a polyolefin selected from polyethylene and polypropylene, and one or two other layers (A) of a polyole fin from the same class as the material of the central layer B, the DSC melting point of the material of the said other layers (A) being lower than the DSC melting point of the material of the said central layer (B), wherein the central layer (B) is between 50 and 99 wt. % of the material and the other layers (A) between 1 and 50 wt. %. The present invention further relates to a method of manufacturing such a tape, film or yarn.

22 Claims, No Drawings

POLYOLEFIN FILM, TAPE OR YARN

The invention is directed to a polyolefin multilayer film, tape or yarn, suitable for producing reinforcing woven and non-woven type materials, especially for strengthening and/or stiffening of products. Polyolefin films of mono- or multiplayer type are generally produced by blown film or cast film extrusion. At some stage of the production process the material can be stretched in order to increase the strength and stiffness of the material.

Polyolefin tapes and yarns are generally produced from polyolefin films of mono- or multilayer type, by cutting the film to the desired width. At some stage of the production process the material can be stretched in order to increase the strength and stiffness of the material.

U.S. Pat. No. 5,578,370 describes a thermoplastic composite material formed of a polypropylene film that is coated with a layer of an ethylene copolymer further comprising propylene units. The coated layer has a lower softening point than the polypropylene core. The publication describes the stretching of the material to a draw ratio of 20:1 in a hot air oven. The examples indicate that composites of the material may have a mean tensile modulus of elasticity of up to 2.5 GPa.

JP-A 2000-8244 describes a flat yarn cloth for reinforcing laminated layers, prepared from a composite yarn of the ABA type, wherein the B layer is a polypropylene and the A layers are based on an ethylene-α-olefin copolymer or a blend of two ethylene-α-olefin copolymers. The yarns are produced by co-extruding the two materials, slitting the film and stretching it to a stretch ratio of 3-12. After weaving, the material is heat treated to weld the yarns together.

EP-A 366,210 describes a three-ply drawn polyolefin laminate comprising a core layer of polypropylene and/or LLDPE and top layers from butene-1 polymers. The material can be used in the packaging area. This material has poor mechanical properties.

EP-A 776,762 describes a polyolefin tape or yarn based on a co-extruded polyolefin material, having a stretch ratio of 6 to 10. This material is described as being suitable for preparing all kinds of cloths, strappings and the like.

Although the properties of the material according to the above citations are quite good, especially with respect to tensile strength, there is a need for further improvement. It is a first object of the present invention to provide a tape or yarn having improved mechanical properties.

In composite materials yarns and cloths are often used for reinforcing. Most commonly used are glass fibre materials. However, glass fibre materials have the disadvantage that they make it very difficult to recycle the materials in which they are incorporated. It would be very useful if the glass fibres could be replaced by polymeric fibres or other polymeric reinforcement components, thereby making it easier to recycle the composite materials. One of the strong advantages of glass fibres reside in the stiffness thereof, which is generally one of the weak aspects of polymeric fibres or other reinforcement components. Accordingly, it is a further object of the invention to provide polymeric materials that have sufficient stiffness to be able to replace glass fibres in composite materials.

With respect to recycling of the products produced from polyolefin films, tapes and yarns it would be an advantage if all components of the material could be classified as the same material, such as polypropylene or polyethylene (including copolymers thereof wherein propylene respectively ethylene forms the majority of the monomeric units). The advantage thereof would be that the resulting recycled material would still be one material, instead of a blend of various components (no contamination).

The present invention is directed to a monoaxially drawn polyolefin multilayer film, tape or yarn of the AB or ABA type having a stretch ratio of more than 12, having an E-modulus of at least 10 GPa, substantially consisting of a central layer (B) of a polyolefin selected from polyethylene and polypropylene, and one or two other layers (A) of a polyolefin from the same class as the material of the central layer B, the DSC melting point of the material of the said other layers (A) being lower than the DSC melting point of the material of the said central layer (B), wherein the central layer (B) is between 50 and 99 wt. % of the material and the other layers (A) between 1 and 50 wt. %.

Surprisingly it has been found that this multilayer material (also referred to as laminate) has excellent properties with respect to mechanical strength, stiffness and the like. Because of its composition, it can be qualified as a mono-component material being either polyethylene or polypropylene, which is an advantage in recycling. More in particular it is possible to recycle production scrap as part of the central layer component. Further, in view of the requirements to manufacturers of consumer goods, such as cars and the like, concerning the possibility of recycling of the components after the useful life of the product, it is important that components consist of one class of material only.

The E-modulus as used herein is the value as measured by ISO 527.

By combining the material composition of the laminate (film/tape/yarn) with the extremely high total stretch ratio, more than 12, preferably more than 15, such as at least 20 and even up to 50 or more, a material has been created that can be used advantageously for all kinds of reinforcements, that can replace e.g. glass fibres in various reinforcing applications and that can be used in various higher temperature applications, such as automotive or aerospace applications. In general, the material of the invention especially suitable for (lightweight) construction applications, high pressure applications and medical applications. It is possible to apply the material in the construction of houses, ships, cars, and the like, but also as reinforcement in high pressure parts, such as tubes (for oil production and the like), or in the production of ortheses.

In the context of this invention, the material has been defined as meeting a minimum level of the total stretch ratio (TSR). TSR is defined as the degree of stretching from an isotropic melt to the final tape or film. This is at least in part defined by the difference in speed between the stretch rollers. The actual value of the TSR can be determined from the birefringence and/or the E-Modulus of the final film, tape or yarn (in stretching direction). The TSR applies especially to the central layer, which preferably is a highly crystalline material. The material of the other layer will generally be less crystalline. The function of the other layer is especially the provision of the possibility to weld the films, tapes, fibres or yarns together when a woven, non-woven or staple/stack of the material is heat treated.

The basic materials to be used in the production of the film, tape or yarn according to the invention are polypropylene or polyethylene.

In case of the use of polypropylene as the material for the film, tape, yarn or fibre, the material for the central, or core, layer B will preferably be a homopolypropylene, preferably having a relatively high molecular weight, such as a weight average molecular weight (MW) of at least 250 000 g/mol, as determined gel permeation chromatography (GPC), and a melting temperature of at least 160° C. It is to be noted that the central layer preferably consists of one material only, but that in case of recycle of production scrap, minor amounts of the material of the other layer may also be present in the core layer. This will generally not exceed 10 wt. %.

In an embodiment wherein the core layer (B) is a polypropylene, the material of the outer layers in this embodiment is, as indicated above, also a polypropylene, preferably a copolymer of propylene with ethylene or another α-olefin. An important aspect thereof is that the softening point of the material, generally indicated by the DSC melting point as defined in ISO 11357-3 is lower than the softening point of the central layer, the difference being at least 10° C. The maximum difference between softening points of the layer B and the layer(s) A is not particularly critical. For practical reasons, the difference will usually be less than about 70° C. Very good results have inter alia been achieved with a film, tape or yarn wherein the difference in softening points is in the range of 15-40° C.

Very good results have been achieved with a random copolymer, such as a propylene-ethylene random copolymer, as the outer layer(s) A. Instead of a copolymer or in combination therewith, a polyolefin, preferably a polypropylene homopolymer or polypropylene copolymer, prepared by making use of a metallocene catalyst is used as the outer layer(s) A. Particular good results have been achieved with such a metallocene based statistical polymer. A suitable example of a metallocene is rac-[Me2Si(2-Me-4-(1-Naphtyl)Ind)2]ZrCl2 H. (described in H. Brintzinger, D. Fischer, R. Mülhaupt, B. Rieger, R. Waymouth, Angew. Chem. 107 (1995) 1255 and in W. Kaminsky, Macromol. Chem. Phys. 197 (1996) 3907).

As the product of the invention is generally used in a form where the films, tapes or fibres are at angle to each other (woven, non-woven materials), the outer layer makes it possible to heat treat the woven, stacked or stapled material, thereby welding together the individual films/fibres/yarns or tapes to create a composite material (e.g. a woven material) of very high structural integrity. By selecting the softening point at a sufficiently large distance from the softening point of the central layer, it is possible to have a heat treatment which does not impair the properties of the material itself.

In an embodiment of the invention, the outer layer or layers A at least consist of a ethylene propylene copolymer, having an ethylene content of between 75 mol % and 99 mol % and a propylene content of between 1 and 25 mol. %. Particular good results have been achieved with such an outer layer or layers in an embodiment wherein the central layer B is a polyethylene.

It is preferred to use a propylene ethylene copolymer, having an ethylene content of between 1 and 25 mol. % and a propylene content of between 75 mol % and 99 mol %, as the material for the outer layers A, in particular if the central layer is a polypropylene. Such a copolymer (as outer layer(s) A), in particular such a random copolymer, has been found to adhere highly satisfactorily to the central layer. Further a composite of tape, yarn or film comprising such a copolymer has been found to have a very good strength, impact resistance and abrasion resistance. It is also possible to use blends of two of these materials.

In case of the use of polyethylene, basically the same considerations apply. As the central layer an HDPE is preferably used, i.e. a polyethylene having a density of at least 950 kg/m³. The weight average molecular weight (MW), as determined by GPC, is preferably at least 250 000 g/mol and the melting point is 130° C. or higher. It is to be noted that the central layer preferably consists of one material only, but that in case of recycle of production scrap, minor amounts of the material of the other layer may also be present in the core layer. This will generally not exceed 10 wt. %.

The material of the other layer is characterised in that it will also be a polyethylene, but now with a lower melting point, the difference being at least 10° C. Suitable polyethylenes are random or block ethylene copolymers, LLDPE, LDPE, VLDPE and the like.

For both types of layer materials it is to be noted that they will generally contain conventional additives, including but not limited to dyes and pigments, flame retarders, UV-stabilisers, anti-oxidants, carbon black and the like.

In a less preferred option of the general approach to the present invention, each of the outer layers at itself consists of two or more separate layers. It is also possible that in the three-layer configuration (ABA), the two outer layers have a slightly different composition.

The major part of the product of the invention consists of the central layer (B). In a preferred embodiment the amount of central layer is between 50 and 99 wt. %, preferably between 60 and 90 wt. %. The balance of the material consist of the outer layers (A).

In practice, the thickness of the tape, film or yarn will generally be up to 300, preferably between 25 and 300 μm. This is governed by the original film thickness and the stretch ratio, in this case the ratio of the speed of the stretch rollers. The width of the tapes can vary over a wide range, such as from 25 μm up to 50 cm or more. The width of the films can also vary over a wide range, e.g. from 1 cm up to 150 cm or more.

As indicated above, the material of the invention has very good mechanical properties. For example, the E-modulus will be at least 10 GPa, preferably at least 12.5 GPa. The tensile strength can easily be at least 0.25 GPa, even up to at least 0.4 GPa (value as measured by ISO 527). The upper limit for the strength that can be obtained in the materials of the present invention is about half of the theoretical value. This means that for polypropylene a value of 1 GPa and for polyethylene a value of 5 GPa will generally be the upper limit.

A film, tape or yarn according to the invention can be used to produce all kinds of materials, such as those discussed in the introduction.

One of the preferred embodiments of the use of the film according to the invention is the production of a reinforcing material for example by winding or stapling/stacking, and/or compacting it from the film. Preferably, the material is then heat treated and pressed. By this heat treatment the individual films are welded together. In this way the structural integrity of the stapled/stacked material will be guaranteed. The said heat treatment will be done at a temperature between the softening point of the material of the outer layers (A) and the material of the central layer (B). A surprising property of the heat treated material is the improved abrasion resistance and the resistance against delamination of the individual films.

During the heat treatment preferably a pressure is applied, in particular if the heat treatment involves subjecting a plate-like material or shaped article to a temperature at which the material of the central layer (B) has a tendency to shrink (due to disorientation of the polymer chains to a more random configuration). For example, polypropylene tends to shrink at a temperature above 100-115° C. Preferably such a pressure is at least 5 bar. Very good results with respect to mechanical properties of the resulting materials have been obtained by compacting the material at a pressure in the range of 20-70 bar.

Alternatively or in combination with applying a pressure, the material may be clamped during heat treatment, in order to avoid shrinking.

One of the preferred embodiments of the use of the tape or yarn according to the invention is the production of a (reinforcing) cloth for example by weaving, winding, chopping and stapling, and/or compacting it from the tape, fibre or yarn. Preferably, the material is then heat treated and pressed. By this heat treatment the individual fibres are welded together. In this way the structural integrity of the cloth will be guaranteed. The said heat treatment will be done at a temperature between the softening point of the material of the outer layers (A) and the material of the central layer (B). A surprising property of the heat treated material is the improved abrasion resistance and the resistance against delamination of the individual fibres.

The production of the material of the invention will generally be done by co-extruding the various layers. Generally cast extrusion is used, whereby the extruder has a flat dye plate, without profile. When a film is manufactured the material may be stretched, after co-extrusion and cooling the material. In case a tape or yarn is manufactured, the material will be slit into the required width of the individual strands (after co-extrusion and cooling), followed by stretching.

The stretching can be a single stage or a multi-stage stretching. The stretch ratio in each step may be between 1.1 and 50—preferably in the range of 2 to 10, more preferably in the range of 3 to 8—the total draw ratio being important for determining the TSR, as defined herein. Very good results, with respect to mechanical properties of the stretched tape, yarn or film, have been achieved in a multi-stage stretching process wherein the stretch ratio in the first stretching stage of the tape, film or yarn is 4-5.

It is preferred to stretch the material at a temperature between 20 and 250° C. Preference is given to stretching at a temperature below the DSC melting point of the material used for the central layer B (herein after "cold stretching"). Very good results have been achieved with a cold-stretching method wherein at least one of the stretching stages are carried out at a temperature below the DSC melting point of the outer layer, the temperature being in the range of 25-75° C., more preferably between 30 and 60° C.

In case of multi-stage stretching, the first stretching is preferably carried out a relatively low temperature, more in particular in the range of 30-60° C., and the subsequent stretching stage or stages are preferably carried at a relatively high temperature, for example at a temperature between 60° C. and the DSC melting point of the outer layer. Thus an a high as possible stretch can be achieved. Good results have been obtained with a subsequent stretching at a temperature of at least 100° C. It is highly preferred to carry out the subsequent stretching at a temperature at which the stretch ratio until breakage (during the stretching process) is essentially maximised. It has been found that a temperature relatively close to the temperature at which the stretching is maximised, a film, tape or yarn is produced with very good mechanical properties, such as a very high E-modulus. The temperature at which the stretching is maximised can routinely be determined by the skilled person.

Between two stretching steps an annealing step may be included. This can also be done after the final stretching.

The material of the invention, both the individual films, tapes, yarns/fibres or a cloth or stapled/stacked material prepared thereof can suitably be used for incorporation in a matrix material, for example as reinforcing material. Examples thereof are various composite materials such as fibre reinforced plastics, automotive applications such as bumpers, dashboards, engine covers and the like, application in the aerospace industry, such as construction materials for aeroplanes and the like. Other applications have been discussed here above.

The invention is now elucidated on the basis of the following examples, which are not to be construed as limiting the invention.

EXAMPLE 1

Using a co-extrusion line, a film was prepared consisting of a core layer B of polypropylene having a DSC softening temperature of 152° C. and two top layers A of a propylene random copolymer having a DSC softening temperature of 135° C. (ABA-structure). The weight ratio A:B:A was 5:90:5.

The film was stretched at 55° C. in a ratio of 1:5 followed by stretching at 128° C. in a ratio of 1:3.4, thereby producing a stretched film that had a stretch ratio of 1:17 and a thickness of 70 µm. The elasticity modulus of the stretched film was 15.8 GPa and the strength was 585 MPa.

EXAMPLE 2

Some of the films of Example 1 were processed into yarns of a width of 2.1 mm. The yarns were woven to produce a fabric material (tissue material), which was subsequently heat treated at 150° C. to consolidate the structure. The final material had quasi isotropic stiffness of 7 GPa (determined by ASTM 3039-76) and a tensile strength of more than 270 MPa. (determined by ISO 527).

EXAMPLE 3

Some of the films of Example 1 were stapled/stacked and subsequently heat treated at 150° C. to consolidate the structure. The final material had quasi isotropic stiffness of 7 GPa and a tensile strength of more than 270 MPa.

EXAMPLE 4

A film was prepared as described in example 1 except for the stretching stages being carried out at a temperature of 128° C. The material (having a stretch ratio of 1:14 and a thickness of 70 µm) had an elasticity modulus of 11.5 GPa and a tensile strength of 450 MPa.

The invention claimed is:

1. Monoaxially drawn polyolefin multilayer film, tape or yarn of the AB or ABA type, having a total stretch ratio of more than 15, having an E-modulus of at least 12.5 GPa, substantially consisting of a central layer (B) of a polyolefin selected from polyethylene and polypropylene, and one or two other layers (A) of a polyolefin from the same class as the material of the central layer (B), the DSC melting point of the material of the said other layers (A) being lower than the DSC melting point of the material of the said central layer (B), wherein the central layer (B) is between 50 and 99 wt. % of the material and the other layers (A) between 1 and 50 wt. % of the material.

2. Film, tape or yarn according to claim 1, wherein the stretch ratio is at least 20.

3. Film, tape or yarn according to claim 1, wherein the stretch ratio is at most 50.

4. Film, tape or yarn according to claim 1, wherein the material of the central and other layers is based on polypropylene.

5. Film, tape or yarn according to claim 1, wherein the material of the central and other layers is based on polyethylene.

6. Film, tape or yarn according to claim 1, wherein the material of the central layer is a crystalline polymer having a weight average molecular weight of at least 250 000 g/mol.

7. Film, tape or yarn according to claim 1, wherein the outer layer or layers (A) at least consist of a random copolymer.

8. Film, tape or yarn according to claim 1, wherein the outer layer or layers A comprise a metallocene catalyzed homopolymer or metallocene catalyzed copolymer.

9. Film, tape or yarn according to claim 1, wherein the material of the central layer is a crystalline polymer having a weight average molecular weight of at least 250 000 g/mol, and wherein the outer layer or layers (A) at least consist of a propylene ethylene copolymer, having an ethylene content of between 1 and 25 mol. % and a propylene content of between 75 mol % and 99 mol %.

10. Film, tape or yarn according to claim 1, wherein the material of the central and other layers is based on polyethylene, and wherein the outer layer or layers (A) at least consist of an ethylene propylene copolymer, having an ethylene content of between 75 mol % and 99 mol % and a propylene content of between 1 and 25 mol. %.

11. Film, tape or yarn according to claim 1, having a thickness of between 25 and 300 μm.

12. Woven or non-woven composite prepared from a film, tape or yarn according to claim 1, optionally having been heat treated.

13. Composite material comprising a matrix material reinforced with film, tape or yarn according to claim 1.

14. Composite material comprising a matrix material reinforced with a woven or non-woven composite according to claim 9.

15. Method for manufacturing a monoaxially drawn polyolefin multilayer film, tape or yarn of the AB or ABA type having a total stretch ratio of more than 15, wherein (i) a film, tape or yarn of the AB or ABA type, substantially consisting of a central layer (B) of a polyolefin selected from polyethylene and polypropylene, and one or two other layers (A) of a polyolefin from the same class as the material of the central layer (B), the DSC melting point of the material of the said other layers (A) being lower than the DSC melting point of the material of the said central layer (B), wherein the central layer (B) is between 50 and 99 wt. % of the material and the other layers (A) between 1 and 50 wt. % of the material, is provided, and (ii) the film, tape or yarn is subjected to a multi-stage stretching at a temperature below the melting point of the central layer B, said multi-stage stretching comprising a first stretching stage and a second stretching stage, wherein the film, tape or yarn is stretched to a total stretch ratio of more than 15 and has an E-modulus of at least 12.5 GPa.

16. Method according to claim 15, wherein at least one of the stretching stages is performed at a temperature in the range of 25-70° C.

17. Method according to claim 16, wherein the film, tape or yarn is first stretched at a temperature in the range of 25-70° C. and thereafter stretched at a higher temperature.

18. Tape, film or yarn, obtained by a method according to claim 15.

19. Method according to claim 15, wherein the tape, film or yarn is stretched to a total stretch ratio of at most 50.

20. Method according to claim 15, wherein said film, tape or yarn provided in step (i) is provided by co-extrusion.

21. Film, tape or yarn according to claim 1, said film, tape or yarn being obtained by a process comprising at least a first stretching and a second stretching, wherein the first stretching is carried out at a lower temperature than the second stretching.

22. Method according to claim 15, wherein said first stretching stage is carried out at a lower temperature than said second stretching stage.

* * * * *